United States Patent
Sautreau (10) Patent No.: US 8,744,823 B2
(45) Date of Patent: Jun. 3, 2014

(54) COMPUTER AIDED DESIGN METHOD FOR CREATING A SURFACE IN A COMPLEX SYSTEM

(75) Inventor: Delphine Sautreau, Paray-Vieille-Poste (FR)

(73) Assignee: SNECMA, Paris (FR)

( * ) Notice: Subject to any disclaimer, the term of this patent is extended or adjusted under 35 U.S.C. 154(b) by 233 days.

(21) Appl. No.: 13/126,273

(22) PCT Filed: Oct. 27, 2009

(86) PCT No.: PCT/FR2009/052061
§ 371 (c)(1),
(2), (4) Date: Apr. 27, 2011

(87) PCT Pub. No.: WO2010/049636
PCT Pub. Date: May 6, 2010

(65) Prior Publication Data
US 2011/0208497 A1 Aug. 25, 2011

(30) Foreign Application Priority Data
Oct. 27, 2008 (FR) ..................... 08 57272

(51) Int. Cl.
*G06F 17/50* (2006.01)

(52) U.S. Cl.
USPC .................... 703/7; 703/1; 703/8

(58) Field of Classification Search
USPC ........... 703/1, 6–9; 700/97, 98; 345/419, 420
See application file for complete search history.

(56) References Cited

U.S. PATENT DOCUMENTS

| | | | |
|---|---|---|---|
| 6,017,186 A | 1/2000 | Hoeger et al. | |
| 6,204,860 B1 | 3/2001 | Singh | |
| 6,268,871 B1 * | 7/2001 | Rice et al. | 345/442 |
| 7,196,702 B1 * | 3/2007 | Lee et al. | 345/419 |
| 2006/0140768 A1 | 6/2006 | Tam et al. | |
| 2007/0258818 A1 | 11/2007 | Allen-Bradley et al. | |

FOREIGN PATENT DOCUMENTS

| | | |
|---|---|---|
| EP | 0 846 867 A2 | 6/1998 |
| EP | 1 681 438 A2 | 7/2006 |
| WO | WO 01/08102 A1 | 2/2001 |

OTHER PUBLICATIONS

Dorfner et al., Axis-asymmetric Profiled Endwall Design Using Multiobjective Optimization Linked with 3D RANS-Flow-Simulations, ASME Turbo Expo 2007.*
International Search Report issued Mar. 3, 2010 in Application No. PCT/FR2009/052061 (With English Translation of Category of Cited Documents).

(Continued)

*Primary Examiner* — Kamini S Shah
*Assistant Examiner* — Michael P Healey
(74) *Attorney, Agent, or Firm* — Oblon, Spivak, McClelland, Maier & Neustadt, L.L.P.

(57) ABSTRACT

A method for creating, from a first axisymmetrical surface, a second surface belonging to a sub-system of a complex system, in which the second surface observes at least one constraint, is disclosed. The method includes: modeling the first axisymmetrical surface, while observing the constraints with at least one parameter, the modeling step including a sub-step for discretizing the first axisymmetrical surface in several points, the parameter being a coordinate of one of these points in a reference system associated with at least one portion of this sub-system, and a sub-step for reconstructing the first axisymmetrical surface from the at least one point and from the at least one constraint; modifying the at least one parameter in the reference system for modeling the second surface; and recording the second surface in a memory of the computer.

12 Claims, 8 Drawing Sheets

(56) References Cited

OTHER PUBLICATIONS

Thomas Reuding, et al., "Automatic Local Updating of CAD Surface Models", Proceedings of the SIAM Conference on Geometric Design, XX, XX, XP002292917, Jan. 1, 1993, pp. 1-10.
J. D. Foley, et al., "Computer Graphics (pp. 279-281)", Addison-Wesley, XP002562665, Jul. 1997, pp. 279-281.
Kinetix, "3D Studio Max User's Guide", 3D Studio Max User's Guide, Kinetix, vol. 1, Mar. 15, 1996, XP007901949, 90 pages.
Wolfram Remlinger, et al., "Sichtanalyse mit dem Menschmodell RAMSIS unter Berücksichtigung altersbedingter sehschwächen", URL: <http://www.dguv.de/iag/de/veranstaltungen/weitere/produktdesign/_dokumente/remlinger.pdf>, XP002569251, May 15, 2008, 32 pages.
K. K. Chand, et al., "Turbomachinery Blade Optimization Using the Navier-Stokes Equations", Lawrence Livermore National Laboratory, URL: <http://www.osti.gov/bridge/servlets/purl/300434-xxDE2T/webviewable/300434.pdf>, XP007911768, Dec. 1997, pp. 1-10.

* cited by examiner

COMPUTER AIDED DESIGN METHOD FOR CREATING A SURFACE IN A COMPLEX SYSTEM

BACKGROUND OF THE INVENTION

The present invention is located in the general field of computer aided design (CAD) of products with view to their manufacturing.

More particularly, the invention takes on the problem of modeling, creating and optimizing complex structures in an industrial environment.

The invention in particular applies in a non-limiting way to the modeling, creation and optimization of three dimensional platforms of the type of those used in the fan of a turbine engine. In the art of CAD, it is known to design systems which have to observe a set of pre-defined constraints.

Such constraints may for example be formed by mechanical, aerodynamic or geometrical constraints.

During the design of a complex system, certain constraints may be <<general>> in the sense that they apply to the whole system and other constraints may be <<particular>> in the sense that they only apply to a sub-system of the complex system.

For example, for designing a turbine engine, it is known how to observe a general aerodynamic constraint which imposes that two contiguous surfaces should be tangent, or a constraint which imposes that the generating curves of a surface should be expressed in the form of a polynomial of the second degree.

In a known way, the whole of the constraints to be observed is expressed in the CAD tool by a set of equations, the surface of the system to be designed having to be selected from the solutions of this set of equations.

The invention is aimed at a CAD tool in which the expression of these equations is excessively simplified.

OBJECT AND SUMMARY OF THE INVENTION

According to a first aspect, the invention relates to a method which may be applied by a computer in order to create from a first axisymmetrical surface, a second surface belonging to a sub-system of a complex system, this second surface having to observe at least one constraint. The method comprises:
- a step for modeling the first axisymmetrical surface, while observing this constraint, with at least one parameter, this modeling step including:
- a discretization sub-step allowing identification of at least one point of the first axisymmetrical surface, the aforementioned parameter being a coordinate of one of these points in a reference system associated with at least one portion of this sub-system; and
- a sub-step for reconstructing the first axisymmetrical surface from this point and from the constraint to be observed;
- a step for modifying the parameter in order to model the second surface; and
- a step for recording the second surface in a memory of the computer.

Generally, modeling of the second surface according to the invention begins by modeling a first so-called original axisymmetrical surface, the latter forming a good starting basis for attaining the second surface to be modeled.

For example, if it is desired to create a second surface formed by a cylinder having a boss, a perfect cylinder may be selected as a first axisymmetrical surface.

According to the invention, this original axisymmetrical surface is modeled with at least one parameter, the model having to observe the constraints of the second surface.

Very advantageously, this modeling is simplified, the first surface being selected as axisymmetrical.

If the example of the cylinder is again taken, the invention proposes to model the perfect cylinder with at least one coordinate of one point of the cylinder and with a geometrical constraint which has to be observed by the cylinder with a boss.

According to the invention, and in a very advantageous way, the coordinate of the point (or of the points) used for modeling the original axisymmetrical surface is expressed in a reference system associated with at least one portion of the sub-system to which belongs the surface to be modeled.

Figure 12A:
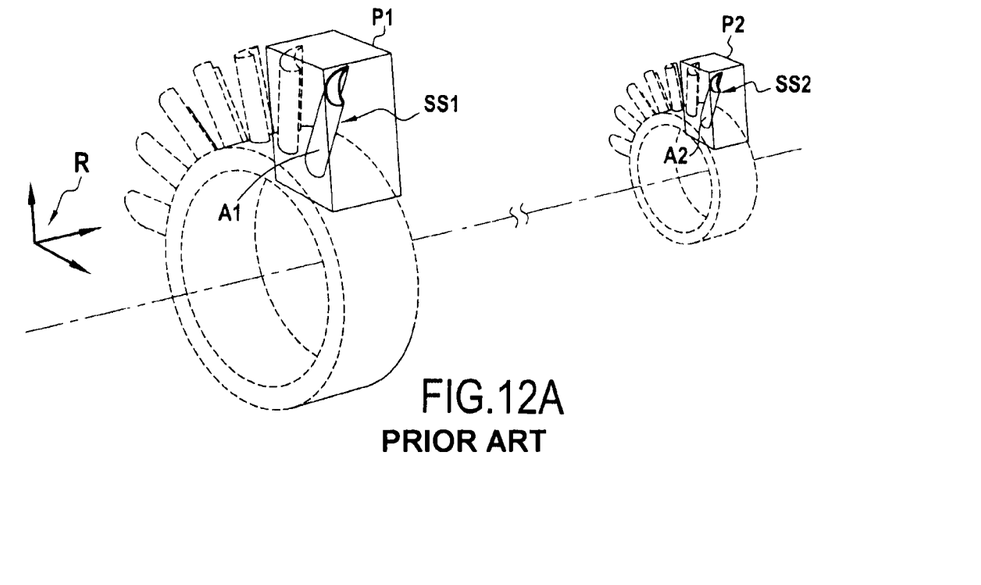
FIGS. 12A and 12B, already described, illustrate a particular aspect of the invention.

FIG. 12A illustrates the drawbacks of the CAD systems of the prior art. In this figure, two sub-systems SS1 and SS2 of a complex system SC are illustrated.

In this example, the complex system SC is formed by a turbine engine, and the sub-systems SS1, SS2 by a stage of vanes A1 of the compressor and by a stage of vanes A2 of the turbine.

In this example, each vane A1, A2 should observe a constraint, i.e. be contained in a parallelepiped P1, P2.

In this CAD system, the equations of the surfaces of the vanes A1, A2 and of the constraints (equations of the parallelepipeds P1, P2) are expressed in a same reference system R.

Figure 12B:
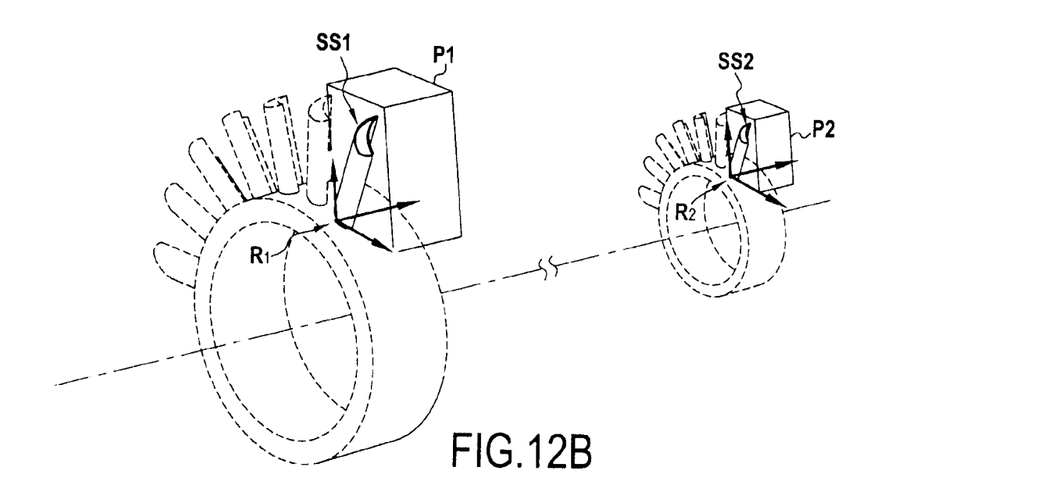

On the contrary, in the invention, and as illustrated in FIG. 12B, the equations of the surfaces and of the constraints are expressed in reference systems local to at least one portion of the relevant sub-systems.

More specifically, in this example of FIG. 12B, a reference system R1 associated with the first stage of vanes and a reference system R2 associated with the second stage of vanes are used.

In an embodiment of the invention, modeling may simply consist of discretizing the original axisymmetrical surface in very many points.

But in practice, the use of such a model would be complex, since the user would be forced in order to modify the aspect of the non-axisymmetrical surface to act on the coordinates of the points taken individually.

This is why the invention proposes in a preferred embodiment to model the surface with a reduced set of points, the original axisymmetrical surface being reconstructed from these points and from at least one constraint.

A constraint example may be a tangency constraint.

Thus, if it is desired to model a cylinder deformed by a boss, while observing tangency constraints of the boss to the original cylinder, it will be in practice sufficient to select a few points in the region of the boss, notably at the intersection of the boss and of the original cylinder, and to bind these points through tangency criteria, so that if the user modifies the coordinates of a point of the boss in order to move it away from the original surface, the coordinates of the other points are automatically modified while observing the tangency constraints.

This operation is of course much less tedious than that of the modification of the coordinates of each of the points of the boss taken individually.

In a particular mode of use of the invention, it is desired to model the surface in the vicinity of a second so-called <<reference system>> surface including an intersection with the non-axisymmetrical surface.

In this case, the invention advantageously proposes defining the reference system associated with the sub-system as a function of the original axisymmetrical surface and of the reference system surface.

For example, if it is desired to deform a cylinder in the vicinity of a planar surface intersecting this cylinder, defining a reference system, two dimensions of which define a plane which is co-planar with this second surface, may be contemplated.

According to a second aspect, the invention relates to a method for optimizing a second surface from a first axisymmetrical surface, this method including:

- a step for defining at least one constraint and one optimization criterion, the value of which depends on the second surface;
- a step for establishing an experimental plane defining a plurality of combinations including different values of parameters;
- a step for creating a second surface according to a method for creating a surface as mentioned above for each of the combinations;
- a step for measuring and saving the optimization criterion of the surface corresponding to each of the combinations; and
- a step for selecting parameters of the combination for which the optimization criterion is optimum.

Generally this optimization method tries to determine the parameters giving the possibility of obtaining the surface which optimizes the selected optimization criterion.

For this, an experimental plan is established with several combinations of parameters, the axisymmetrical surface is modeled as mentioned earlier for each of the combinations of parameters, the optimization criterion of the surface is measured for each combination and then the parameters of the surface are selected, for which the optimization criterion is optimum.

In a particular embodiment of the invention, it is desired to be able to model surfaces in the environment of the CATIA V5 (registered trademark) CAD software package of Dassault Systèmes.

Accordingly, the invention aims according to a third aspect at a method for creating a computer model which may be used in the CATIA V5 (registered trademark) CAD tool including a step for creating a second surface under constraint from a first axisymmetrical surface according to a method for creating a surface as mentioned above, the computer model having as input this original axisymmetrical surface and a second surface of any reference system, the parameters of the modeling method being the parameters of the computer model.

It is recalled that a "model" or "smart model" is, in the field of CAD, a CATIA V5 (registered trademark) entity in which are encapsulated several geometrical entities defined via a specific design methodology.

The models are created by the user via the Product Knowledge Template (PKT) workshop of CATIA V5 (registered trademark).

They allow the reproduction of a succession of geometrical constructions and operations adapted to the input data (geometrical parameters and elements). The succession of geometrical constructions and operations is performed once from generic input data. The method is then "photographed" in order to encapsulate it in a model which may be reused subsequently with specific input data.

There exist two types of models: templates and optimized copies.

The templates are CATIA entities which may be assimilated to a black box, the encapsulated geometrical entities being not visible to the final user.

The optimised copies are CATIA (registered trademark) entities which may be assimilated to an automatic construction operation, the encapsulated geometrical entities being recreated in the tree of specifications.

In practice, the different steps of each of the methods according to the invention (method for creating a surface, method for creating a computer model, and method for optimizing a surface) may be determined by instructions of computer programs.

Accordingly, the invention also aims at a computer program on an information medium, this program including suitable instructions for applying the steps of at least one of the methods mentioned earlier. Indeed, the design of a computer program may be contemplated for each of the methods, or a computer program capable of applying at least two of these methods.

These computer programs may use any programming language and be in the form of source code, object code or intermediate code between source code and object code, such as in a partly compiled form or in any desirable form.

In a particular embodiment of the invention, the computer program including instructions for executing the steps of the method for creating a computer model may appear as a library capable of being integrated, as known by one skilled in the art, into the CATIA V5 (registered trademark) CAD tool.

The invention also aims at a recording medium readable by a computer on which a computer program is recorded, capable of applying at least one of the methods of the invention when this program is executed by this computer.

The invention also aims at a computer and a work station, including a recording medium according to the invention, for applying a method for modeling an axisymmetrical surface and/or applying a method for creating a template and/or applying an optimization method as mentioned above.

SHORT DESCRIPTION OF THE DRAWINGS

Other characteristics and advantages of the present invention will become apparent from the description made below, with reference to the appended drawings which illustrate an exemplary embodiment thereof without any limitation. In the figures.

DETAILED DESCRIPTION OF AN EMBODIMENT

We shall now describe a particular use of the invention for optimizing the surface of three-dimensional platforms of the type of those used in the fan of a turbine engine with the purpose of optimizing the air flow velocity between the blades of this fan.

Figure 1:
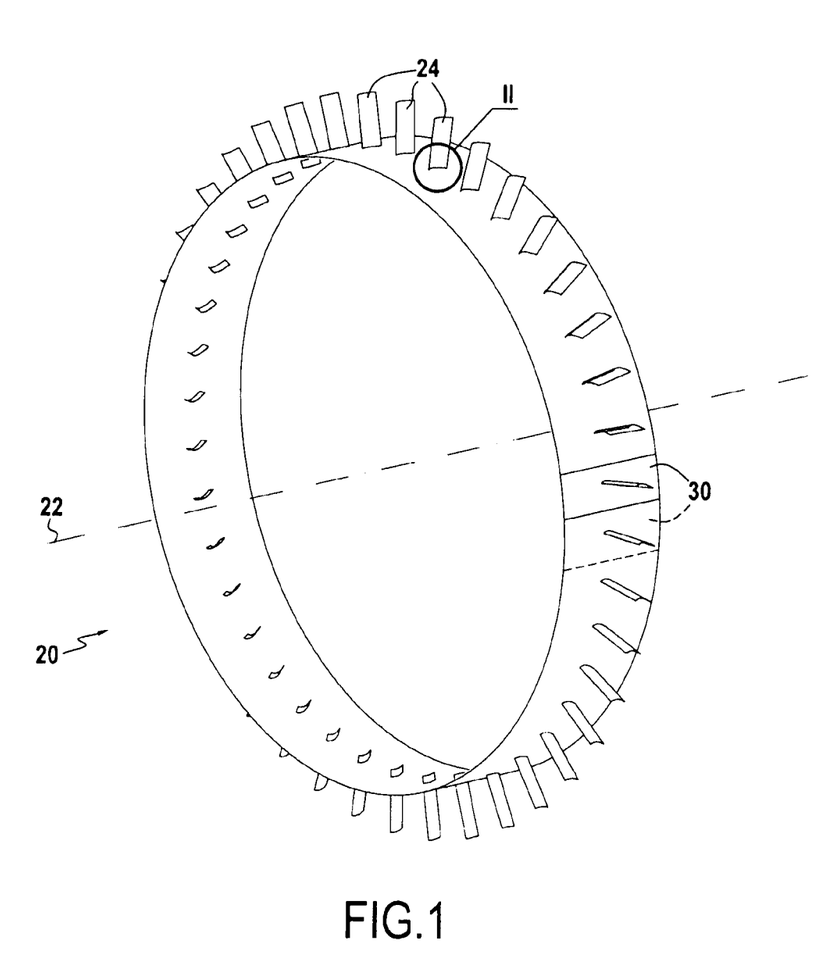
FIG. 1 schematically illustrates an exemplary axisymmetrical surface which may be used as a starting basis for creating a surface according to the invention.

FIG. 1 schematically illustrates a shroud 20 axisymmetrical with respect to the longitudinal axis 22 of this fan.

We shall assume in this example that this shroud 20 is part of the stage of a compressor (sub-system in the sense of the invention) of the turbine engine (system in the sense of the invention).

The shroud 20 consists of a plurality of platforms which define a substantially continuous axisymmetrical annular surface when they are placed end to end circumferentially.

It is recalled that an axisymmetrical platforms is a portion of an axisymmetrical surface, i.e. a surface portion generated from a generating curve and an axis of revolution.

A blade 24 is attached on each of the platforms 30 in a way known per se.

The axisymmetrical external surface 30 of the platforms forms a flow vein vane surface for the air flow between the blades 24.

Figure 2:
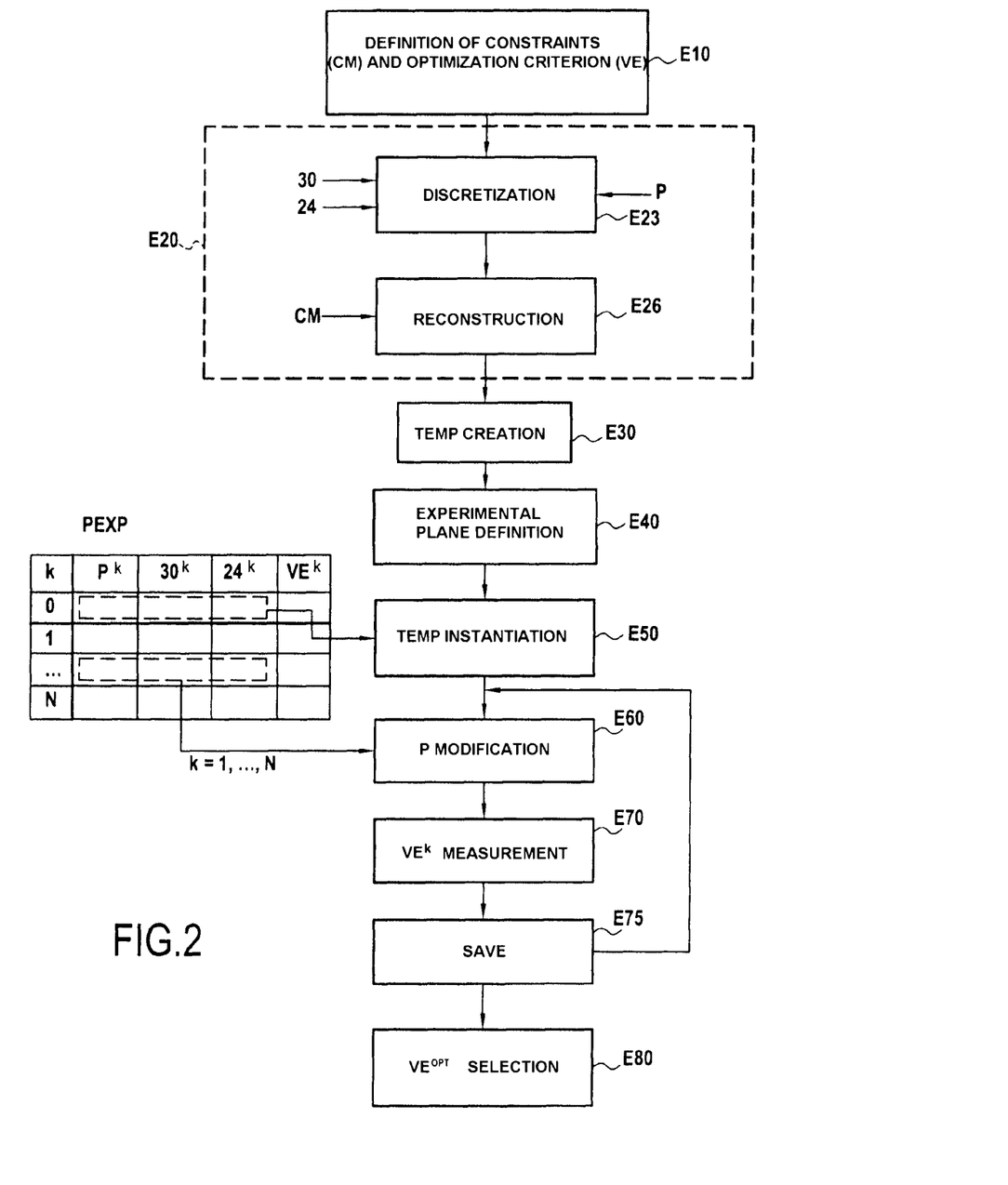
FIG. 2 illustrates as a flow chart, the main steps of a method for optimizing a surface according to the invention in a particular embodiment.

With reference to FIG. 2, we shall now describe how to model the axisymmetrical platform 30 with parameters, these parameters may then be modified, according to an experimental table, in order to deform the axisymmetric platform 30 and obtain different models of platforms $40^k$ for which the aerodynamic performance i.e. the air flow velocity between the blades, may be measured.

With reference to FIG. 2, we shall now describe more specifically, the optimization method applied in this example.

This method includes a first step E10 during which the criterion to be optimized is defined, in this case the air flow velocity VE between the blades 24, and the constraints CM which have to be observed for each of the non-axisymmetrical vanes $40^k$ which will be evaluated.

The CM constraints will be explained with reference to E26 described later on.

The step E10 for defining constraints is followed by a step E20 during which the original axisymmetrical surface formed by the platform 30 of FIG. 1 is modeled.

In the exemplary embodiment described here, this modeling step includes:
a discretization sub-step E23; and
a reconstruction sub-step E26.

Figure 3:
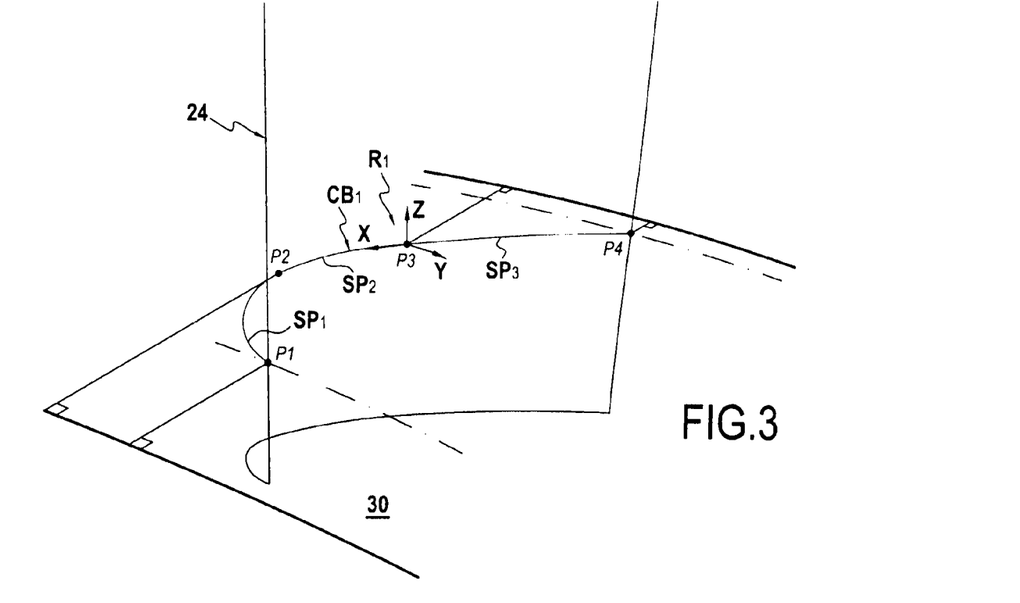
FIG. 3 illustrates the modeling of the axisymmetrical surface of FIG. 1.

The discretization sub-step E23 is illustrated in FIG. 3. It illustrates an enlarged view along II of FIG. 1, at the intersection between the axisymmetrical platform 30 and a blade 24.

During this discretization sub-step E23, a certain number of points P1 to P4 are defined at the intersection between the vane 30 and the skeleton surface of the blade 24. In another exemplary embodiment, points of the axisymmetrical platform 30 which are not located at the intersection of the blade 24 may be obtained.

It is recalled that the skeleton surface of the blade may be defined as a median surface to the suction side and the pressure side of the blade.

The coordinates of each of the points $P_i$ are expressed in a reference system associated with at least one portion of this stage of the compressor.

More specifically, in this example, the coordinates of the points P1 to P4 are defined in a same reference system $R_1$, illustrated in FIG. 3, two axes of this reference system (X, Y) being tangent to the axisymmetrical platform 30, the third axis of this reference system (Z) being tangent to the blade 24.

In this example, the reference system $R_1$ is neither orthogonal nor orthonormal. It will be noted that in this exemplary embodiment, the reference system $R_1$ is associated with the point P3, the origin of this reference system coinciding with the point P3.

Each point P1 to P4 is therefore defined by three coordinates, the coordinate along the Z axis forming a parameter for modeling the axisymmetrical platform 30.

During the reconstruction sub-step E26, constraints are established between the points P1 to P4 from the constraints CM defined in step E10.

In the example described here, these constraints are wireframe constraints on the one hand and surface constraints on the other hand.

More specifically, the wireframe constraints selected in this example are constraints according to which points P1 to P4 are connected two by two through splines $SP_1$, $SP_2$, $SP_3$, these splines being grouped by three in order to obtain a curve $CB_1$ of degree 2 passing through the four points P1 to P4, each spline being tangent to its neighboring spline(s).

The surface constraint selected here imposes that the extreme splines $SP_1$ and $SP_3$ are tangent to the axisymmetrical platform 30.

In the embodiment described here, this reconstruction sub-step E26 finishes modeling of the axisymmetrical vane 30.

Figure 4:
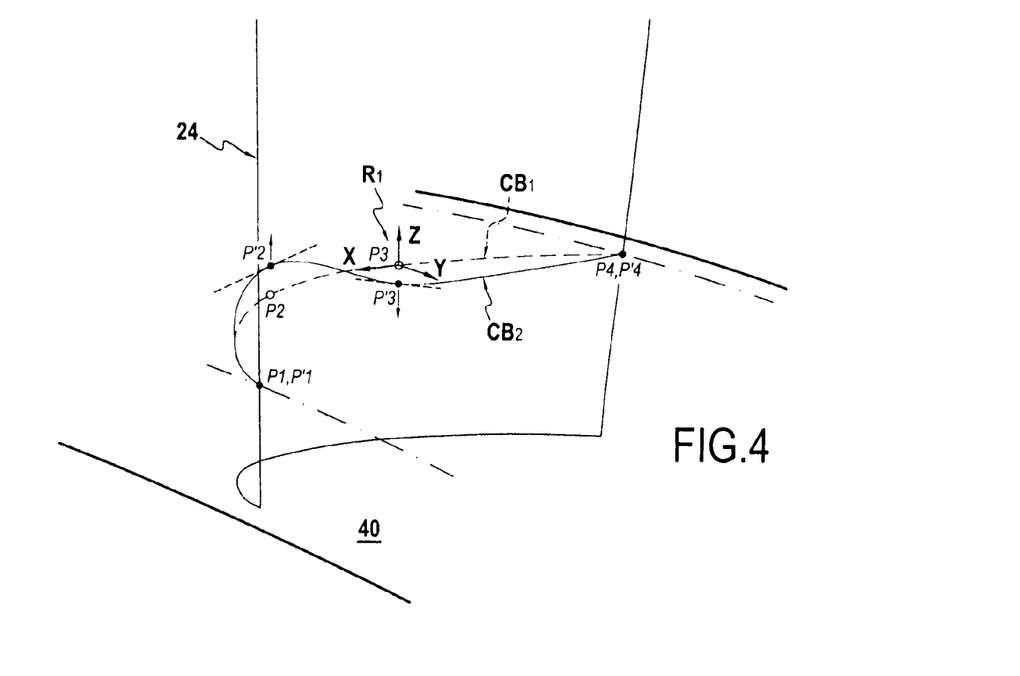
FIG. 4 illustrates the modification of parameters defined in FIG. 3.

It is remarkable to note, with reference to FIG. 4, that as soon as one coordinate of one of the points P1 to P4 along the Z axis is changed in order to move this point away from the axisymmetrical platform 30, a model of a non-axisymmetrical platform 40 is obtained.

Therefore, the invention proposes an excessively simple solution for modeling a non-axisymmetrical surface 40 from an original axisymmetrical surface 30.

In the following of this document, P1' to P4' will refer to the point obtained from the point P1 to P4 by modification of its Z coordinate.

The displacement of the points P1 to P4 into P'1 and P'4 deforms the curve $CB_1$. In FIG. 4, $CB_2$ references the curve after the deformation, reference $CB_1$ in this figure illustrating the plot of this curve before deformation.

With FIGS. 3 and 4 described earlier it was possible to illustrate the general principle of the modeling of a surface 40 under constraints according to the invention.

Figure 5:
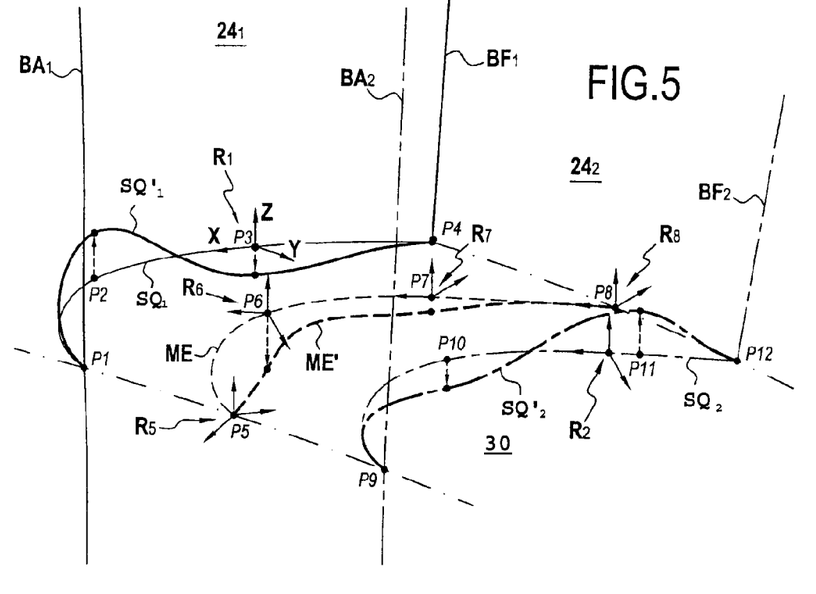
FIG. 5 illustrates different curves of the surface obtained from the axisymmetrical surface of FIG. 3.

With reference to FIG. 5, we shall illustrate the modeling of a surface of the platform 30 of FIG. 1.

In this figure, we have illustrated a first blade $24_1$ in solid lines and a second blade $24_2$ in dashed lines.

The leading edges of the blades $24_1$ and $24_2$ are referenced as $BA_1$ and $BA_2$ respectively.

The trailing edges of the blades $24_1$ and $24_2$ are referenced as $BF_1$ and $BF_2$.

In FIG. 5 are illustrated:
four points P1 to P4 at the intersection of the axisymmetrical platform 30 and of the skeleton surface of the blade $24_1$;
four points P9 to P12 at the intersection of the axisymmetrical platform 30 and of the skeleton surface of the blade $24_2$; and
four points P5 to P8 of the axisymmetrical platform 30 in an intermediate area between the two areas defined via this platform with the blade $24_1$ and the blade $24_2$, respectively.

These twelve points P1 to P12 are obtained during the discretization of the axisymmetrical platform 30.

According to the invention, the coordinates of each of these points are expressed in a reference system associated with a portion of the stage of the compressor. More specifically:

the coordinates of the points P1 to P3 are expressed in the reference system $R_1$ already described;

the coordinates of the points P9 to P12 are expressed in a reference system $R_2$, two axes (X, Y) of this reference system being tangent to the axisymmetrical platform 30, the third axis of this reference system (Z) being tangent to the blade $24_2$;

the coordinates of each of the points P5 to P8 are expressed in a reference system $R_5$ to $R_8$, two axes (X, Y) of each of these reference systems being tangent to the axisymmetrical platform 30, the third axis of this reference system (Z) being normal to this platform.

In the exemplary embodiment described here, the reference systems $R_i$ are selected according to the degrees of freedom of the points which they locate.

Thus, for the points P1 to P4 and P9 to P12 to which a movement on a vane is imposed in a single direction, the reference systems $R_1$, $R_2$ are selected, one Z axis of which coincides with this direction. Of course, in this example the axes Z of the reference systems $R_1$, $R_2$ are not parallel.

On the other hand, the points P5 to P8 may be moved in all directions. In this example it is chosen to associate a reference system with each of these points.

Whatever the case, the use of a reference system local to the sub-system facilitates the description of the surfaces and of the constraints and gives the possibility of better viewing the displacements for the user. With it, it is also possible to facilitate the calculation of the positions of each of the points.

According to the invention, three curves $SQ_1$, ME and $SQ_2$ passing through the points P1 to P4 and P5 to P8 and P9 to P12, respectively, are then defined during a reconstruction step.

Each curve $SQ_1$, ME and $SQ_2$ is defined by three splines. For example the curve $SQ_1$ is defined by the splines (P1, P2), (P2, P3) and (P3, P4).

One skilled in the art will understand that the curves $SQ_1$ and $SQ_2$ obtained mathematically, approach physical curves corresponding to the intersection of the skeleton of the blade $24_1$ and of the skeleton of the blade $24_2$ with the axisymmetrical platform 30.

The curves $SQ_1'$, ME' and $SQ2'$ respectively represent the parameterizable curves $SQ_1$, ME and $SQ_2$ deformed by the displacement of the points P2, P3, P6, P7, P10 and P11 along the Z axis of each of the relevant reference systems.

Figure 6:
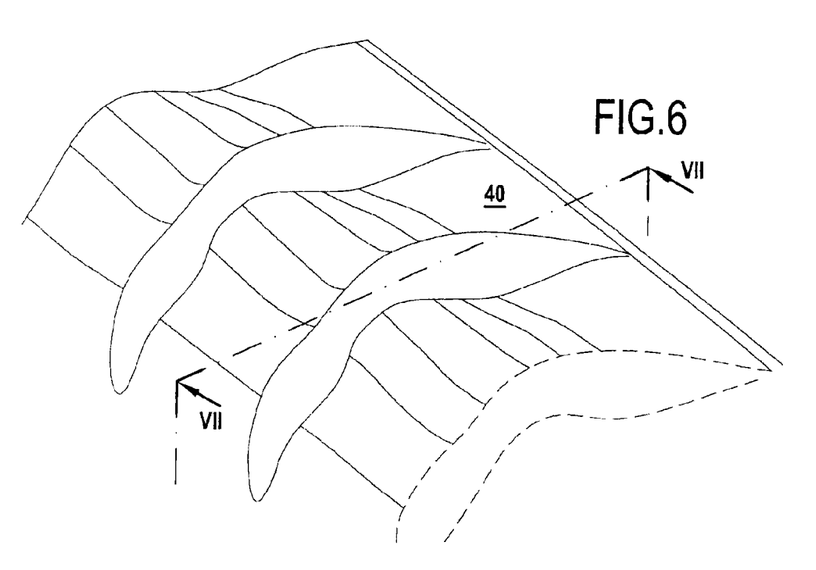
FIGS. 6 to 8 illustrate the modeled surface in FIG. 5 and its use in an example.

FIG. 6 illustrates the surface 40 obtained by connecting the curves $SQ_1'$, ME', $SQ_2'$ while observing the surface constraints which impose that the extreme splines remain tangent to the axisymmetrical platform 30, an extreme spline being a spline with an end comprised on a leading edge BA or a trailing edge $BF_i$.

Figure 7:
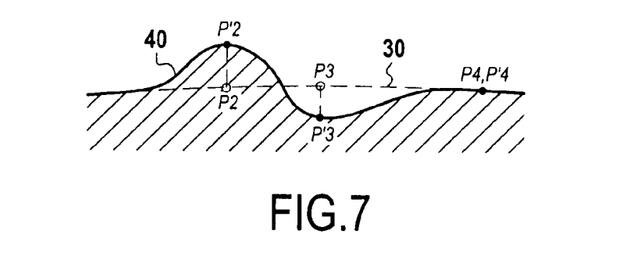

FIG. 7 is a sectional view VII-VII of FIG. 6 in which are illustrated the points P2, P3 and P4 of the original axisymmetrical platform 30 on the one hand and the points P'2 to P'4 of the platform 40 obtained from the points P2 to P4 by modification of one parameter i.e. by modification of a coordinate along the Z axis parallel to the blades $24_1$ and $24_2$.

Figure 8:
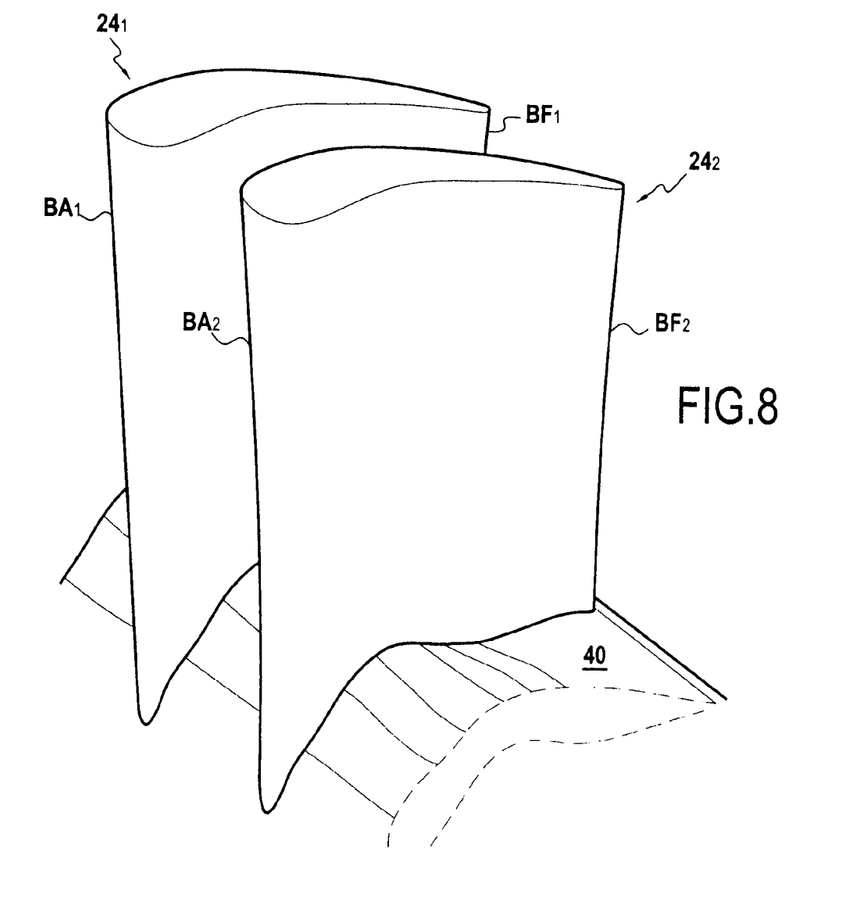

FIG. 8 illustrates the blades $24_1$ and $24_2$ on the surface 40 of FIG. 6.

It is recalled, that in the embodiment described here, the surface 40 is sought which allows optimization of the flow velocity VE between the blades 24.

According to the second aspect of the invention, it is proposed to carry out this optimization in the CAD environment of CATIA V5 (registered trademark) by using the result of the modeling step E20 in order to create during a step E30, a CATIA computer model, the parameters of this computer model being the coordinates of the points P1 to P12 in their respective reference systems.

This computer model may accept as input any original axisymmetrical surface, notably a platform 30, and any second reference system surface, for example the skeleton surface of a blade 24.

An experimental plane PEXP illustrated in FIG. 2 is then defined during step E40.

In the example described here, this experimental plane includes N combinations, each combination including values of parameters $P^k$, an original axisymmetrical surface $30^k$ and a reference system surface $24^k$.

The step E40 for defining the experimental plane is followed by a step E50 for instantiation of the CATIA V5 (registered trademark) computer model obtained in step E30 with the original parameters P (coordinates along the Z axis in the reference system $R_i$ equal to 0) so that the first modeling is very close to the original axisymmetrical surface.

And then the optimization method according to the invention includes a loop formed by the steps E60 to E75 applied for all combinations k (=1 to N) of the experimental plane PEXP.

This loop includes a first step E60 during which the parameters are modified by selecting the line k=1 of the experimental plane, in order to create a platform $40^1$.

And then, during step E70, the parameter to be optimized for the thereby obtained platform $40^1$, i.e. the flow velocity $VE^1$, is measured.

This parameter $VE^1$ is saved in memory in the experimental plane PEXP during step E75.

The value k is then incremented (k=2) and one returns to step E60.

When all the combinations have been used, the E60-E75 loop ends and the optimum flow velocity $VE^{OPT}$ is sought in the experimental plane PEXP.

The platform $40^{OPT}$ is thereby identified (step E80), as well as the blade surface $24^{OPT}$ which allow this flow to be obtained.

In FIG. 2, a procedure of the main steps of a method for optimizing a non-axisymmetrical surface according to the invention is described.

Figure 9:
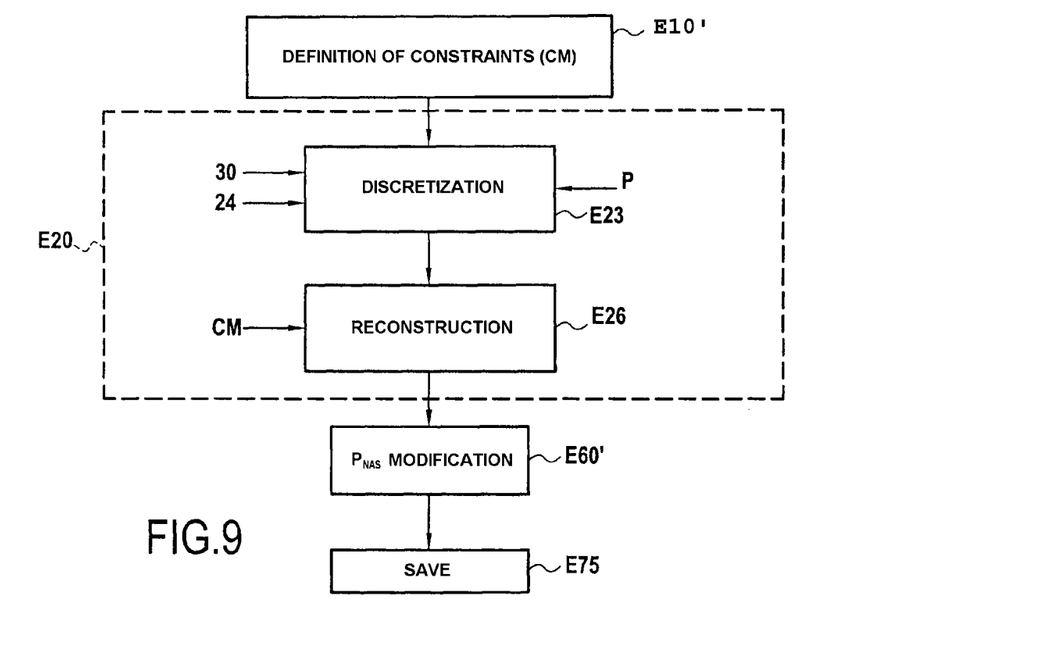
FIG. 9 illustrates as a flow chart, the different steps of a method for creating a surface according to the invention in a particular embodiment.

FIG. 9 illustrates as a flow chart, the main steps of a method for creating a non-axisymmetrical surface according to the invention, this method may be used in a context other than that of optimization.

This method includes:

a step E10' for defining wireframe and surface constraints;

a step E20 for modeling an original axisymmetrical surface while observing the aforementioned constraints;

a step E60' for modifying at least one parameter for modeling a surface; and a step E75 for saving this surface in a memory.

Step E10' differs from the step E10 of the optimization method described with reference to FIG. 2, in that it does not define any optimization criterion.

The modeling step E20 is identical with that of the optimization method described with reference to FIG. 2.

The step E60' for modifying a parameter is accomplished in this example described here, without using any template, by manually modifying at least one parameter of the axisymmetrical surface model.

The saving step E75 is identical with the one of the optimization method described with reference to FIG. 2.

Figure 10:
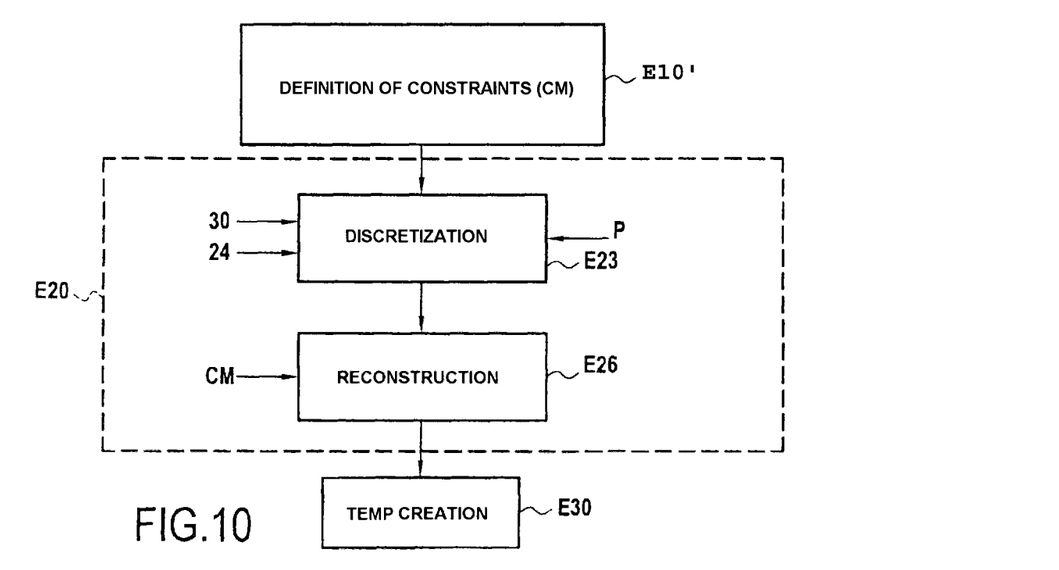
FIG. 10 illustrates as a flow chart, the different steps of a method for creating a computer model according to the invention in a preferred embodiment.

FIG. 10 illustrates the main steps of a method for creating a CATIA V5 (registered trademark) computer model according to the invention, such a method may be applied outside the context of optimization.

In the example described here, this method for creating a template includes:

steps E10' for defining constraints and E20 for modeling of the modeling method of FIG. 9; and the step E30 for creating a computer model of the optimization method of FIG. 2.

Figure 11:
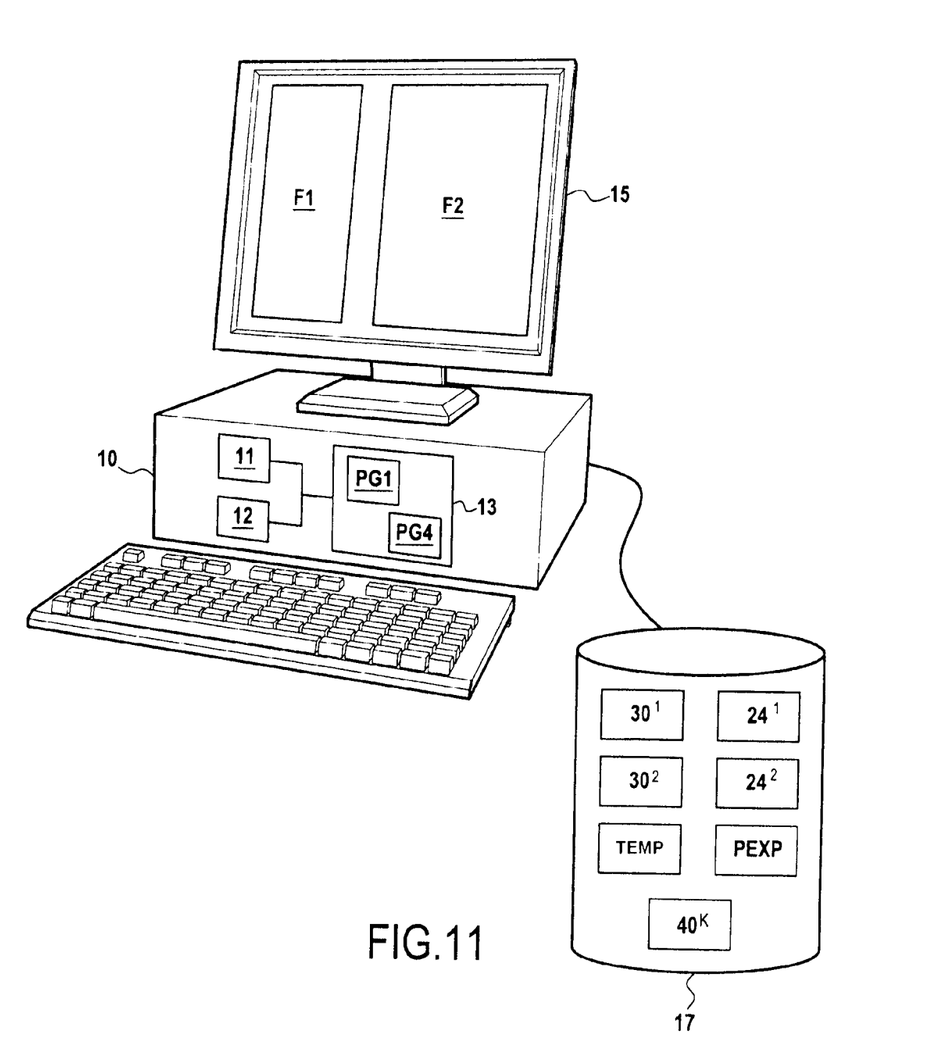
FIG. 11 illustrates a computer according to the invention.

FIG. 11 schematically illustrates a computer or workstation 10 according to the invention.

This computer includes a processor 11, a RAM memory 12, and a read only memory of the ROM type 13.

The read-only memory 13 includes a computer program PG1 including instructions for executing the steps of the optimization method of FIG. 2 and a computer program PG4 including instructions for applying the CATIA V5 (registered trademark) CAD software package.

In an embodiment described here, the computer 10 also includes an external hard disc 17 in which the CATIA V5 computer model obtained during step E30 described earlier and an experimental plane PEXP obtained during step E40 described earlier are stored.

In an embodiment described here, the external hard disc 17 also includes different original axisymmetrical surfaces $30^k$ and different reference system surfaces $24^k$, the surfaces $30^k$ and $24^k$ being parameters of the experimental plane PEXP.

The platforms $40^k$ obtained by the loop of steps E60 to E75 are also saved in the external hard disc 17.

In the exemplary embodiment described here, the computer 10 includes a screen 15 on which two windows F1 and F2 are displayed:

the window F1 allowing the user to work on the experimental plane PEXP; and the window F2 is used for viewing the platforms $40^k$ obtained for the k different combinations of the experimental plane PEXP.

The invention also relates to a computer not shown including a read only memory storing one or more computer programs PG1, PG2 and PG3.

The invention claimed is:

1. A method for designing a component of a gas turbine engine, said component being one of a fan, a compressor, and a turbine, the method being applied by a computer for creating, from a first axisymmetrical surface, a second surface belonging to said component, said second surface having to observe at least one constraint, the method comprising:

modeling, using a processor of said computer, said first axisymmetrical surface, while observing said at least one constraint with parameters, said modeling step including:

discretizing, using said processor, to obtain points of said first axisymmetrical surface located at an intersection of said first axisymmetrical surface and a reference system surface;

reconstructing, using said processor, said first axisymmetrical surface from said points and from said at least one constraint, said reconstructing step including defining a parameterizable curve;

modifying, using said processor, at least one parameter associated to one point of said points, along a Z axis in a reference system; and recording, using said processor, said second surface in a memory of said computer; wherein said points being movable along a displacement direction, and each parameter of said parameters being a coordinate of one point of said points of said first axisymmetrical surface in said reference system;

said reference system being associated with at least one portion of said component and selected for said point for modeling said second surface and so that said Z axis of said reference system coincides with the displacement direction;

said parameterizable curve connecting at least two of said points located at the intersection of said first axisymmetrical surface and said reference system surface while observing at least one wireframe constraint, and being deformed by displacing the points connected by said curve along the Z axis of the reference systems associated with said points, and being connected while observing at least one surface constraint for reconstructing said first axisymmetrical surface; and said at least one wireframe constraint and said at least one surface constraint are established from said at least one constraint.

2. The method for designing a component of a gas turbine engine according to claim 1, wherein said reference system is associated with at least one of said points.

3. The method for designing a component of a gas turbine engine according to claim 1 or 2, wherein said reference system is defined according to said first axisymmetrical surface and to said reference system surface including an intersection with said first axisymmetrical surface.

4. A method for creating a computer model used in a CAD tool comprising:

creating a second surface under a constraint from a first axisymmetrical surface according to a method in accordance with claim 3, said model having as an input said first axisymmetrical surface and a reference system surface, parameters of said method for creating a surface being parameters of said computer model.

5. A method for optimizing a second surface from a first axisymmetrical surface, the method comprising:

defining at least one constraint or one optimization criterion, the value of said at least one constraint or one optimization criterion depending on said second surface;

establishing an experimental plane defining a plurality of combinations including different values of parameters;

creating said second surface according to a method in accordance with claim 1 for each of said combinations;

measuring and saving the optimization criterion of said second surface corresponding to each of said combinations; and selecting the parameters of the combination for which said optimization criterion is optimum.

6. The optimization method according to claim 5, wherein the combinations of said experimental plane further include different first axisymmetrical surfaces and several reference system surfaces, and the method further comprises:

creating a computer model including said second surface, said creating including a step for instantiation of said model and modifying the parameters of said model with one of the combinations of the experimental plane.

7. A non-transitory storage medium readable by a computer on which is recorded a computer program, wherein the program, when executed, causes the computer to perform the method according to any of claim 1 or 5.

8. A computer including the storage medium according to claim 7.

9. A non-transitory storage medium readable by a computer on which is recorded a computer program, wherein the program, when executed, causes the computer to perform the method according to claim 4.

10. A computer including the storage medium according to claim 9.

11. A non-transitory storage medium readable by a computer on which is recorded a computer program, wherein the program, when executed, causes the computer to perform the method according to claim 6.

12. A computer including the storage medium according to claim 11.

\* \* \* \* \*